United States Patent Office 3,282,848
Patented Nov. 1, 1966

3,282,848
PROCESS AND COMPOSITION FOR THE
REMOVAL OF TARNISH ON METALS
John H. Haslam, Landenberg, Pa., assignor to E. I. du Pont de Nemours and Company, Wilmington, Del., a corporation of Delaware
No Drawing. Filed Jan. 28, 1964, Ser. No. 340,778
14 Claims. (Cl. 252—105)

This application is a continuation-in-part of copending application Serial No. 241,561 filed December 3, 1963 and now abandoned, which copending application is a continuation-in-part of then copending application Serial No. 186,354 filed April 10, 1962, now abandoned and which was a continuation-in-part of then copending application Serial No. 178,537, filed March 9, 1962, also now abandoned.

This invention relates to a composition and process for the treatment of metals and is more particularly directed to a composition and process for removing oxygen containing tarnish on metals by bringing them into contact with a mercaptoalkanol, a mercaptoacid, a mercaptoamine or their alkali metal, alkaline earth metal or amine salts.

The process of the invention is preferably practiced using the composition of the present invention which comprises one or more mercapto compounds in admixture with specific antioxidants.

The mercapto compounds which can be used according to this invention are those having a maximum of 6 carbon atoms of the formula (1)
$$R-\underset{\underset{H}{\overset{S}{|}}}{\overset{H}{\underset{|}{C}}}-X$$

where

R is hydrogen, —COOH, alkyl containing from 1 through 5 carbon atoms, alpha or beta hydroxyalkyl containing from 1 through 5 carbon atoms which have from 1 through 5 OH groups; and
X is $(CH_2)_nNH_2$, hydrogen, $(CH_2)_nOH$, $$(CH_2)_{n-1}COOH$$

or $$\underset{\underset{OH}{|}}{CHCH_2OR'}$$

where

R' is alkyl containing from 1 through 4 carbon atoms; and
n is 1 or 2 but when X is hydrogen, R must be COOH or alpha or beta hydroxyalkyl containing from 1 through 5 carbon atoms which have 1 through 5 OH groups.

Illustrative of these compounds are:

2-mercaptoethanol
2-mercaptopropanol-1
1-mercaptopropanol-2
1-mercaptobutanol-2
2-mercaptoethylamine
mercaptoacetic acid
β-mercaptopropionic acid
mercaptosuccinic acid
α-mercaptoglycerol
α-mercaptosorbitol The alkali metal, alkaline earth metal, ammonium and amine salts of the above compounds can be used with substantially equivalent results.

Illustrative salts are:

ALKALI METALS

Sodium
Potassium
Lithium
Rubidium
Cesium

ALKALINE EARTH METALS

Magnesium
Calcium
Strontium
Barium

AMINES

Amine salts of the mercapto compounds of Formula 1 are obtained from amines having a maximum of 10 carbon atoms of the formula:

$$R_1-N\underset{\diagdown R_3}{\diagup R_2}$$

where $R_1$, $R_2$ and $R_3$ are the same or different and are selected from the group consisting of hydrogen, alkyl containing from 1 through 5 carbon atoms, hydroxyalkyl containing from 2 through 5 carbon atoms, amino alkyl containing from 2 through 5 carbon atoms and methoxy alkyl containing from 2 through 5 carbon atoms.

Illustrative of particularly suitable amines are:

Monoethylamine
Dimethylamine
Trimethylamine
Normal butylamine
Ethylenediamine
Monoethanolamine
Diethanolamine
Triethanolamine The sodium and potassium salts offer particular advantages and are preferred.

The antioxidants contained in the compositions of the present invention are selected from the group consisting of the sulfite, bisulfite, hydrosulfite and metabisulfite of sodium, potassium and lithium. As a practical matter for economic reasons and ease of handling the sodium sulfite is preferred.

The metals treated according to the process of this invention can be copper and any of the copper alloys such as brass and bronze, and also zinc, cadmium, cobalt, lead, nickel, tin and alloys of these metals with other metals and with each other. The process is particularly effective in the removal of oxygen containing tarnish on copper and copper-containing metals.

Oxygen containing tarnishes are removed from metals according to this invention by bringing the metal into contact with a mercapto compound of Formula 1 in any convenient fashion. For example, the metal can be dipped into the compound or a solution of the compound. Alternatively, the compound or a solution of the compound can be sprayed or brushed on the metal. Contact is maintained until the tarnish has been removed. The article being cleaned is then rinsed to remove the cleaning solution and dried.

A cleaning solution should contain from .001% to 50% by weight of the mercapto compound with a preferred range being about .005% to 10% by weight and an even more preferred range being .1% to 2%. The optimum amount for any particular metal will be apparent to those skilled in the art.

The pH of the solution will depend upon the metal being treated. For example, if copper or copper alloys are being cleaned, the pH of the solution should be maintained in the range of 9–14 by the addition of sodium hydroxide or another suitable base. Operation outside these pH limits usually gives slower cleaning.

In the treatment of zinc, it is desirable that the cleaning operation be conducted with a solution whose pH is from 5–6, but good results can be obtained with pH up to about 12. The optimum pH required for cleaning any particular metal with the cleaning composition of the present invention will be readily apparent to those skilled in the art.

As above described the process of this invention can be practiced by cleaning metals with solutions containing one or more of the mercapto compounds of Formula 1 in solution without any other ingredient. However, it is preferred in the practice of this invention that the solution contain, in addition to the mercapto compounds of Formula 1, an antioxidant selected from the group consisting of the sulfite, bisulfite, hydrosulfite and metabisulfite of sodium, potassium or lithium. These specific antioxidants, as described below, prolong the useful life of the cleaning compositions of the present invention and further will not produce intolerable insoluble precipitates.

The metals being cleaned by the mercapto compounds of this invention catalyze oxidation and hydrolysis reactions when the mercapto compounds are exposed to air and moisture. This is particularly true when the metals being cleaned are copper and nickel. These reactions can be illustrated as follows:

OXIDATION

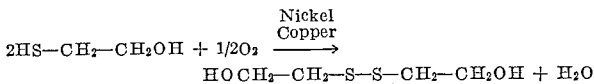

HYDROLYSIS

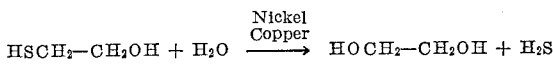

By the inclusion of the above-named antioxidants, such atmospheric oxidation and hydrolysis reactions are substantially reduced or prevented. By greatly inhibiting or preventing these reactions these specific antioxidants prolong the useful life of the mercapto solutions.

The presence of an antioxidant in solutions to be used in cleaning copper is especially desirable because this metal more readily than others catalyzes the oxidation of the mercapto compounds and causes a brown precipitate to form after the solution has been used.

In cleaning compositions of the present invention the ratios by weight of mercapto compound to antioxidants ranges from about 10:1 to 1:5 with a preferred ratio ranging from about 4:1 to 1:1.5. Most preferred is a ratio of about 1:1.

For convenience and stability, a dry mix of the mercapto compound or its salt and an antioxidant can be prepared, which is simply dissolved in water before use. Such a dry mix will ordinarily contain from 40% to 80% by weight of the mercapto compound or its salt and from 60% to 20% by weight of an antioxidant. Preferably the mix will contain amounts of mercapto compounds or their salts and antioxidants in the ratio by weight of 1:1.

The mix is prepared by weighing out the desired proportions of ingredients and dissolving them in water to which sodium hydroxide is added in an amount sufficient to maintain the desired pH level. This solution is then evaporated, in a vacuum for example, and the resulting precipitate is mechanically pulverized. This dry mix is then ready for use by merely dissolving it in water.

The mercapto compounds of the present invention can also be used with promoters and other adjuvants to clean metallic surfaces more effectively. For example, in those instances where it is desired to remove oxide containing tarnishes from metals having surfaces that are also covered with dirt and grease, detergents can be added to the solutions containing the mercapto compounds. Suitable detergents can be those anionic, cationic and nononic surface-active agents that are listed in "Detergents and Emulsifiers—Up to Date," 1962 by John W. McCutcheon, Inc. and Bulletin E–607 of the Bureau of Entomology and Plant Quarantine of the U.S. Department of Agriculture. In addition, commercial detergents such as phosphates, soaps, etc. can be used in conjunction with the compositions of the present invention. Also, to promote more rapid removal of heavy oxide deposits from metal, abrasives can be added to the cleaning solution of the present invention.

Additionally, the compounds of Formula 1 can be incorporated into oils as emulsions or solutions.

The treatment of copper-containing alloys according to this invention has several advantages over those processes used heretofore. First, oxygen containing tarnish is removed much more rapidly. Secondly, cuprous oxide is removed directly and no oxidizing agent need be present to make the process work efficiently. Third, since no oxidizing agent is used there is no loss of metal that would result by action of the oxidizing agent. This makes the cleaning solution last longer.

In the treatment of zinc, the removal of white rust is also much more rapid than with conventional treatments.

This invention will be more readily understood and easily practiced by referring to the following illustrative examples.

*Example 1*

A cleaning solution is prepared by dissolving 25 pounds of 2-mercaptoethanol in 1000 pounds of water. Sodium hydroxide is added to bring the pH to 10.

Heavily tarnished sheet copper is continuously immersed in this bath. Contact time is about 30 seconds. The sheet is then rinsed with water and heated with steam to give rapid drying.

The copper, as it comes from the bath, is bright and shiny, with no visible tarnish.

The mercapto compounds in the following list can be substituted for 2-mercaptoethanol, in equivalent amounts, with similar results.

1-mercaptopropanol-2
Mercapto acetic acid
2-mercaptoethylamine
α-Mercaptoglycerol

*Example 2*

One thousand slightly tarnishd brass lipstick cases are placed in a barrel tumbler containing 15 gallons of water at 120° F. and 5 grams of sodium alkyl sulfonate. To this solution 100 grams of sodium hydroxyethyl mercaptide are added.

The brass lipstick cases are tumbled in this solution for 15 minutes. The cases are removed and placed on a screen where the excess solution is permitted to drain. The cases are then rinsed with water and are found to be free of oxide tarnish.

After drying the cases are bright, shiny and ready for burnishing operations and lacquering.

*Example 3*

Automobile radiators and heater cores suspended from an overhead conveyer are passed through an elongated tank filled with a solution of 1% sodium hydroxyethyl mercaptide and 1% sodium sulfite. The tank is maintained at a temperature of 120° F. by the injection of steam.

The conveyer system lowers the automobile radiator and heater cores into the tank at one end and raises them out at the other with a total immersion time in the solution of two minutes.

As the cores are removed from the cleaning solution tank they are subjected to an air blast which removes the excess cleaning solution adhering to the cores. This excess cleaning solution flows back into the cleaning solution tank where it can be reused.

Subsequent to the cleaning operation the conveyer passes the cores through successive cold water and hot water rinsing tanks and then to an oven where they are dried at 225° C.

Upon inspection the cores are clean and free of oxides, and there is no evidence of any chemical deposition of copper on the soldered portions of the cores being cleaned even after extended use of the solution.

After continuous use for about one month during which time sodium hydroxyethyl mercaptide and sodium sulfite are periodically added to maintain constant concentrations, this cleaning solution exhibits substantially little if any oxidation or hydrolysis of the mercapto compound and continues to be an excellent cleaning solution.

*Example 4*

A galvanized iron sheet having a deposit of white rust is cleaned by dipping the sheet into a 5% aqueous solution of 2-mercaptoethanol which has been adjusted to a pH of 5–6 by the addition of sodium hydroxide. After being immersed for one minute, the sheet is removed, rinsed with water, and dried with a blast of hot air.

Inspection reveals that the white rust has been removed from the sheet which is ready for painting.

*Example 5*

A cleaning solution is prepared by dissolving 5% 2-mercaptoethanol and 5% sodium sulfite in water and adjusting the pH to 10 with sodium hydroxide.

This solution can be intermittently used to clean copper, as in Example 1. The useful life of the solution is extended to 10 days as constrasted to one day for a solution not containing the sodium sulfite.

The useful life of the solution can be extended in the same manner by substituting equivalent amounts of sodium bisulfite, sodium hydrosulfite, sodium metabisulfite for the sodium sulfite.

*Example 6*

Miscellaneous small brass parts which are to be electroplated first with copper, second with nickel and third with chromium are first cleaned in a solution containing 1% sodium hydroxyethyl mercaptide and .001% sodium alkylsulfonate to remove oxides, oils and dirt from their surfaces. They are then rinsed thoroughly and electroplated in a copper cyanide bath.

From the copper cyanide bath the parts are again rinsed thoroughly and immediately immersed in a nickel sulfate bath where a nickel coating is electroplated on the previously deposited copper plating.

After nickel plating the parts are again rinsed and then immersed in a solution containing 1% of 2-mercaptoethanol ethylene diamine salt. From this cleaning bath the parts are again rinsed and are chrome plated in a chromatic acid bath.

Inspection reveals that a bright and adherent chromium coating is obtained.

*Example 7*

Small assorted screws which have been electroplated with a dull cadmium coating for protection are immersed for 30 seconds in a 1% solution of sodium hydroxyethyl mercaptide.

The screws are rinsed and dried. The previously dull coating is now bright and presents a more attractive appearance.

*Example 8*

A solution of sodium 2-hydroxyethyl mercaptide is prepared by reacting equivalent amounts of 2-mercaptoethanol and sodium hydroxide in water. To this solution an amount of sodium sulfite which is equivalent to the 2-mercaptoethanol is added. This solution is then evaporated to dryness in a vacuum.

The resulting precipitate is pulverized to form a dry mix containing approximately 50 parts of sodium 2-hydroxyethyl mercaptide and 50 parts of sodium sulfite. This mix is very stable against atmospheric oxidation for an extended period.

A 5% solution of this mix in water can be used to clean copper according to the method described in Example 1 with substantially identical results. The solution remains free of copper precipitates after use for longer than one week.

I claim:

1. A process for the removal of oxygen containing tarnishes on metals selected from the group consisting of copper, zinc, cadmium, cobalt, lead, nickel, tin, and alloys containing these metals, said process comprising bringing the metals coated with oxygen containing tarnishes into contact with a compound having a maximum of 6 carbon atoms of the formula

where
R is selected from the group consisting of hydrogen, —COOH, alkyl containing from 1 through 5 carbon atoms, hydroxyalkyl containing from 1 through 5 carbon atoms which have from 1 through 5 OH groups; and X is selected from the group consisting of $(CH_2)_nNH_2$, hydrogen, $(CH_2)_nOH$, $(CH_2)_{n-1}COOH$, and

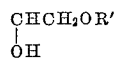

where
R' is selected from the group consisting of alkyl containing from 1 through 4 carbon atoms; and
n is a whole number selected from the group consisting of 1 and 2; and
when X is hydrogen, R must be selected from the group consisting of COOH and alpha and beta hydroxyalkyl containing from 1 through 5 carbon atoms having 1 through 5 OH groups, and the alkali metal, alkaline earth metal, ammonium and amine salts of said compound.

2. A process for the removal of oxygen containing tarnish on copper containing metals, said process comprising bringing the metals coated with oxygen containing tarnishes into contact with a member of the group consisting of 2-mercaptoethanol and sodium-2-hydroxyethylmercaptide.

3. A process for the removal of oxygen containing tarnish on copper containing metals, said process comprising bringing the metals coated with oxygen containing tarnish into contact with mercaptoacetic acid.

4. A process for the removal of oxygen containing tarnish on copper containing metals, said process comprising bringing the metal coated with oxygen containing tarnish into contact with 1-mercaptopropanol-2.

5. A composition for use in removing oxygen containing tarnishes on metals selected from the group consisting of copper, zinc, cadmium, cobalt, lead, nickel, tin, and alloys containing these metals comprising a compound having a maximum of 6 carbon atoms of the formula

where
R is selected from the group consisting of hydrogen, —COOH, alkyl containing from 1 through 5 carbon atoms, hydroxyalkyl containing from 1 through 5 carbon atoms which have from 1 through 5 OH groups; and X is selected from the group consisting of $(CH_2)_nNH_2$, hydrogen, $(CH_2)_nOH$, $(CH_2)_{n-1}COOH$, and

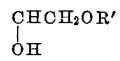

where
R' is selected from the group consisting of alkyl containing from 1 through 4 carbon atoms; and
n is a whole number selected from the group consisting of 1 and 2; and
when X is hydrogen, R must be selected from the group consisting of COOH and alpha and beta hydroxyalkyl containing from 1 through 5 carbon atoms having 1 through 5 OH groups, and the alkali metal, alkaline earth metal, ammonium and amine salts of said compound in admixture with an antioxidant selected from the group consisting of the sulfite, bisulfite, metabisulfite and hydrosulfite of sodium, potassium and lithium, the ratio by weight of said compound to said antioxidant ranging from about 10:1 to 1:5.

6. The composition of claim 5 containing in addition, a detergent.

7. A dry mix suitable for dissolution in water to provide compositions for use in removing oxygen containing tarnishes on metals selected from the group consisting of copper, zinc, cadmium, cobalt, lead, nickel, tin, and alloys containing these metals comprising a compound having a maximum of 6 carbon atoms of the formula

where
R is selected from the group consisting of hydrogen, —COOH, alkyl containing from 1 through 5 carbon atoms, hydroxyalkyl containing from 1 through 5 carbon atoms which have from 1 through 5 OH groups; and
X is selected from the group consisting of $(CH_2)_nNH_2$, hydrogen, $(CH_2)_nOH$, $(CH_2)_{n-1}COOH$, and $$\underset{\underset{OH}{|}}{CHCH_2OR'}$$

where
R' is selected from the group consisting of alkyl containing from 1 through 4 carbon atoms; and
n is a whole number selected from the group consisting of 1 and 2; and
when X is hydrogen, R must be selected from the group consisting of COOH and alpha and beta hydroxyalkyl containing from 1 through 5 carbon atoms having 1 through 5 OH groups, and the alkali metal, alkaline earth metal and amine salts of said compound and an antioxidant selected from the group consisting of the sulfite, bisulfite, metabisulfite and hydrosulfite of sodium, potassium and lithium, the ratio by weight of said compound to said antioxidant ranging from about 10:1 to 1:5.

8. A dry mix suitable for dissolution in water to provide compositions for use in removing oxygen containing tarnishes on metals selected from the group consisting of copper, zinc, cadmium, cobalt, lead, nickel, tin, and alloys containing these metals comprising sodium-2-hydroxyethyl mercaptide and sodium sulfite, the ratio by weight of said hydroxyethyl mercaptide to said sodium sulfite ranging from about 10:1 to 1:5.

9. A composition for use in removing oxygen containing tarnishes on metals selected from the group consisting of copper, zinc, cadmium, cobalt, lead, nickel, tin, and alloys containing these metals comprising an aqueous solution of about .001 to about 50% by weight of a compound having a maximum of 6 carbon atoms of the formula

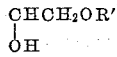

where
R is selected from the group consisting of hydrogen, —COOH, alkyl containing from 1 through 5 carbon atoms, hydroxyalkyl containing from 1 through 5 carbon atoms which have 1 through 5 OH groups; and
X is selected from the group consisting of $(CH_2)_nNH_2$, hydrogen, $(CH_2)_nOH$, $(CH_2)_{n-1}COOH$, and

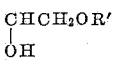

where
R' is selected from the group consisting of alkyl containing from 1 through 4 carbon atoms; and
n is a whole number selected from the group consisting of 1 and 2; and
when X is hydrogen, R must be selected from the group consisting of COOH and alpha and beta hydroxyalkyl containing from 1 through 5 carbon atoms having 1 through 5 OH groups, and the alkali metal, alkaline earth metal, ammonium and amine salts of said compound in admixture with an antioxidant selected from the group consisting of the sulfite, bisulfite, metabisulfite and hydrosulfite of sodium, potassium and lithium, the ratio by weight of said compound to said antioxidant ranging from about 10:1 to 1:5.

10. A dry mix suitable for dissolution in water to provide compositions for use in removing oxygen containing tarnishes on metals selected from the group consisting of copper, zinc, cadmium, cobalt, lead, nickel, tin, and alloys containing these metals consisting essentially of 40 to 80% by weight sodium 2-hydroxyethylmercaptide and 60 to 20% by weight sodium sulfite.

11. A dry mix suitable for dissolution in water to provide compositions for use in removing oxygen containing tarnishes on metals selected from the group consisting of copper, zinc, cadmium, cobalt, lead, nickel, tin, and alloys containing these metals consisting essentially of 40 to 80% by weight 2-mercaptoethanol and 60 to 20% by weight sodium sulfite.

12. A composition as defined in claim 9 wherein the compound is a member of the group consisting of 2-mercaptoethanol, mercaptoacetic acid, and 1-mercaptopropanol-2, and the sodium salts of said compounds, and wherein the antioxidant is sodium bisulfite.

13. A composition as defined in claim 12 wherein the compound is 2-mercaptoethanol and its concentration in the solution is between about 0.005 and 10% by weight, and wherein the ratio by weight of 2-mercaptoethanol to sodium bisulfite is in the range of about 4:1 to 1:1.5.

14. A composition as defined in claim 13 wherein the concentration of 2-mercaptoethanol is between 0.1 and 2% by weight and wherein the ratio by weight of 2-mercaptoethanol to sodium bisulfite is about 1:1.

References Cited by the Examiner

UNITED STATES PATENTS

| | | | |
|---|---|---|---|
| 2,050,732 | 8/1936 | Roberts | 252—400 |
| 2,088,590 | 8/1937 | Engels et al. | 252—400 XR |
| 2,525,166 | 10/1950 | Brown et al. | 252—143 XR |
| 2,550,434 | 4/1951 | Viles et al. | 252—395 XR |
| 2,613,131 | 10/1952 | Barnes et al. | 252—395 |
| 2,628,199 | 2/1953 | Lowenheim | 252—142 |
| 2,738,330 | 3/1956 | Hill | 252—48.6 |
| 2,802,788 | 8/1957 | Flaxman | 252—105 |

LEON D. ROSDOL, *Primary Examiner.*

JULIUS GREENWALD, *Examiner.*

M. WEINBLATT, *Assistant Examiner.*